US010438053B2

(12) United States Patent
Dunlap et al.

(10) Patent No.: US 10,438,053 B2
(45) Date of Patent: *Oct. 8, 2019

(54) BIOMETRIC IDENTIFICATION SYSTEMS AND METHODS

(71) Applicant: STONE LOCK GLOBAL, INC., Leawood, KS (US)

(72) Inventors: David D. Dunlap, Leawood, KS (US); Yulun Hu, Hunan (CN)

(73) Assignee: STONE LOCK GLOBAL, INC., Leawood, KS (US)

(*) Notice: Subject to any disclaimer, the term of this patent is extended or adjusted under 35 U.S.C. 154(b) by 0 days.

This patent is subject to a terminal disclaimer.

(21) Appl. No.: 15/649,144

(22) Filed: Jul. 13, 2017

(65) Prior Publication Data
US 2017/0308740 A1    Oct. 26, 2017

Related U.S. Application Data

(63) Continuation of application No. 14/022,080, filed on Sep. 9, 2013, now Pat. No. 9,740,917.

(60) Provisional application No. 61/792,922, filed on Mar. 15, 2013, provisional application No. 61/698,347, filed on Sep. 7, 2012.

(51) Int. Cl.
*G06K 9/00*    (2006.01)
(52) U.S. Cl.
CPC ............... *G06K 9/00288* (2013.01)
(58) Field of Classification Search
CPC ............... G06K 2009/00932; G06Q 20/40145
See application file for complete search history.

(56) References Cited

U.S. PATENT DOCUMENTS

| 6,940,976 B1* | 9/2005 | Matyas, Jr. | ........... H04L 9/0866 380/280 |
| 2008/0270803 A1* | 10/2008 | Zizzi | ...................... G06F 21/34 713/186 |

(Continued)

OTHER PUBLICATIONS

Huang et. al., "Local Binary Patterns and Its Application to Facial Image Analysis: A Survey", 2011, IEEE Transactions on Systems, Man, and Cybernetics—Part C: Applications and Reviews, vol. 41, No. 6, pp. 765-781.*

*Primary Examiner* — Vu Le
*Assistant Examiner* — Guillermo M Rivera-Martinez
(74) *Attorney, Agent, or Firm* — Arent Fox LLP

(57) ABSTRACT

An exemplary embodiment of the present invention provides a method of verifying an identity of a person-to-be-identified using biometric signature data. The method includes creating a face sample database based on biometric signature data from a plurality of individuals, calculating a feature database by extracting selected features of entries in the sample database, calculating positive samples by calculating a feature absolute value distance for a same position of any two different images from one person, calculating negative samples by calculating a feature absolute value distance for a same position of different people, calculating a key bin feature using a learning algorithm, calculating a classifier from the key bin feature for use in identifying and authenticating an acquired face image of a person-to-be-identified and identifying and authenticating the person-to-be-identified using the classifier and the acquired face image of the person-to-be-identified.

18 Claims, 11 Drawing Sheets

(56) References Cited

U.S. PATENT DOCUMENTS

| | | | | |
|---|---|---|---|---|
| 2009/0292641 A1* | 11/2009 | Weiss | ............... | G06F 21/32 |
| | | | | 705/66 |
| 2010/0138668 A1* | 6/2010 | Tsuria | ............... | G06F 21/32 |
| | | | | 713/186 |
| 2011/0026781 A1* | 2/2011 | Osadchy | ............ | G06K 9/00221 |
| | | | | 382/118 |

\* cited by examiner

BIOMETRIC IDENTIFICATION SYSTEMS AND METHODS

CROSS-REFERENCE TO RELATED APPLICATIONS

This application for patent is a continuation application of U.S. patent application Ser. No. 14/022,080, entitled "BIOMETRIC IDENTIFICATION SYSTEMS AND METHODS," which was filed on Sep. 9, 2013, which claims the benefit of U.S. Provisional Application Ser. No. 61/698,347, filed on Sep. 7, 2012, and 61/792,922, filed on Mar. 15, 2013, which are incorporated herein by reference in their entireties as if fully set forth below.

TECHNICAL FIELD OF THE INVENTION

The various embodiments of the present disclosure relate generally to encryption systems and methods. More particularly, the various embodiments of the present invention are directed to systems and methods for using personal biometric data to encrypt and decrypt data.

BACKGROUND OF THE INVENTION

There has been a growing need for stronger identity verification to protect personal property, both physical and electronic. For example, it is important to control access to premises, vehicles, and personal property so that only authorized users are allowed access. In a traditional example, a user may carry and use a key, which is designed to fit a lock to allow the user of the key to open the lock and gain entry. A loss or damage to the key, however, can render access impossible. In another example, a user may use a key fob to remotely lock or unlock the doors of a vehicle by, e.g., pressing a button on the fob to generate an infrared ("IR") or radio frequency ("RF") signal, which is detected by a sensor in the vehicle, which controls the doors. Such vehicle keyless access systems have been known for years, and a key is still required by the user in order to operate the ignition system. Other similar keyless access implementations may involve inserting and presenting a magnetic card or the like in a slot or a card reader/detector, or enabling an authorized user to key in a numeric or alphanumeric code on a provided keypad. In each of these conventional techniques, however, it is very difficult to determine if the person holding the key/card is the actual authorized user. Instead, these systems, only verify whether the key—not the user—is authorized. Thus, an unauthorized user may gain control of an authorized key to access the property.

Additionally, when valuable assets are in digital form, such as financial records, personal information, media content, and other exploitable targets of many sorts, the duplication and theft of those assets has historically been a constant threat. Further, it is often difficult to determine when a theft or duplication has occurred. Accordingly, various encryption techniques have been developed in an attempt to prevent theft and duplication of digital assets.

The following provides a brief description of conventional digital rights management ("DRM") functionality. DRM tools encrypt a digital object and only allow decryption (provided the key is presented) when a set of rules has been satisfied. Rules might be related to proof of payment, user authorization, or the authentication of a connected device.

A second, more significant opportunity for protection of digital assets, however, is in the area of encryption itself. There are two primary forms of encryption—symmetric encryption and asymmetric encryption. With symmetric encryption, encryption and decryption can be performed by the same key (or with a second key that is computable from the first key). Asymmetric encryption involves the use of two keys—a private key and a public key. The public key may be known to anyone and can be used to encrypt messages and/or verify digital signatures. The private key, on the other hand, can be known to only the owner and can be used to decrypt messages encrypted by the matching public key and/or create digital signatures. Specifically, the public key used to encrypt messages or verify digital signatures cannot decrypt messages or create digital signatures. Instead, a matching pair is needed to perform both encryption and decryption and/or signature creation and verification. Asymmetrical encryption is a clever application of number theory concepts instead of merely substitution and permutation, thus providing increased security over symmetric encryption.

There are multiple applications for asymmetrical encryption techniques. For example, a sender can encrypt a data message with the receiver's public key. The receiver can then use its private key to decrypt the message. Additionally, a sender can "sign" a message with its private key. The receiver can then very the sender's signature with the sender's public key. Moreover, two sides can exchange a session key.

Unfortunately, security of the encryption keys, themselves, has become an issue. For example, with conventional encryption techniques, it can be difficult to determine whether a person decrypting a message—even though that person might have the correct private key—was the person the message was intended, i.e., the private key could have been stolen.

Therefore, there is a desire for improved user identification systems. Various embodiments of the present invention address this desire.

SUMMARY OF THE INVENTION

Various embodiments of the present invention relate to systems and methods for providing real-time identity verification. An exemplary embodiment of the present invention provides a method of identity verification using biometric data. The method can comprise creating a face sample database based on a plurality of acquired face samples, each of the plurality of acquired face samples including parameters for defining different postures and expressions, calculating a feature database by extracting selected features of entries in the face sample database, calculating positive samples and negative samples based on entries in the feature database, calculating a key bin feature using a learning algorithm, the key bin feature distinguishing each of the positive samples and negative samples, and calculating a classifier from the key bin feature for use in identifying and authenticating an acquired face image of a person-to-be-identified.

In some embodiments of the present invention, calculating a feature database comprises calculating at least one of local binary pattern ("LBP") features and local ternary pattern ("LTP") features from entries in the face sample database.

In some embodiments of the present invention, calculating positive samples comprises calculating a feature absolute value distance for a same position of any two different images from one person.

In some embodiments of the present invention, calculating negative samples comprises calculating a feature absolute value distance for a same position of different people.

In some embodiments of the present invention, the method further comprises using the classifier to create a private key associated with an intended recipient of a data message in a data encryption system.

In some embodiments of the present invention, the learning algorithm is an adaptive boosting learning algorithm.

In some embodiments of the present invention, the method further comprises receiving a face image of the person-to-be-identified, extracting at least one feature from the face image, and using the classifier to determine the identity of the person-to-be-identified.

Another exemplary embodiment of the present invention provides a system for identity verification using biometric data. The system can comprise a process and a memory. The memory can store logical instructions that, when executed by the processor, are configured to create a face sample database based on a plurality of acquired face samples, each of the plurality of acquired face samples including parameters for defining different postures and expressions, calculate a feature database by extracting selected features of entries in the face sample database, calculate positive samples and negative samples based on entries in the feature database, calculate a key bin feature using a learning algorithm, the key bin feature distinguishing each of the positive samples and negative samples, and calculate a classifier from the key bin feature for use in identifying and authenticating an acquired face image of a person-to-be-identified.

Another exemplary embodiment of the present invention provides a method of verifying an identity of a person-to-be-identified using biometric data. The method can comprise creating a sample database based on biometric data from a plurality of individuals, calculating a feature database by extracting selected features from entries in the sample database, calculating positive samples and negative sampled based on entries in the feature database, calculating a key bin feature using an adaptive boosting learning algorithm, the key bin feature distinguishing each of the positive samples and negative samples, and calculating a classifier from the key bin feature for use in identifying and authenticating a person-to-be-identified.

In some embodiments of the present invention, the method further comprises receiving a first set of biometric signature data of the person-to-be-identified at a first location, extracting at least one feature from the biometric data of the person-to-be-identified, and using the classifier to determine the identity of the person-to-be-identified at the first location.

In some embodiments of the present invention, the first set of biometric signature data of the person-to-be-identified is based on a desired security level of authentication.

In some embodiments of the present invention, the method further comprises receiving the first set of biometric signature data of the person-to-be-identified at a second location, extracting at least one feature from the biometric data of the person-to-be-identified, and using the classifier to determine the identity of the person-to-be-identified at the second location.

Various embodiments of the present invention also relate to biometric encryption and authentication systems and methods. An exemplary embodiment of the present invention provides a method of biometric encryption comprising: providing a public key; encrypting a message with the public key; transmitting a message to an intended recipient; generating a private key associated with the intended recipient based on biometric data associated with the intended recipient; and decrypting the message with the private key.

In some embodiments of the present invention, the biometric data associated with the intended recipient is generated immediately prior to decrypting the message.

In some embodiments of the present invention, the biometric data associated with the intended recipient is obtained via a biometric sensor.

Another exemplary embodiment of the present invention provides a method of generating a private key. The method comprises: obtaining biometric data of a user; and generating a private key associated with the user based on the biometric data.

Another exemplary embodiment of the present invention provides a method of generating a digital signature. The method comprises: generating a private key based on biometric data associated with a user; and generating a digital signature using the private key. In some embodiments of the present invention, the method can further comprise verifying a digital signature using a public key.

Another exemplary embodiment of the present invention provides a method for providing access to a digital file. The method comprises: encrypting a digital file; creating a list of one or more recipients permitted to decrypt the file; generating a private key based on biometric data associated with at least one of the one or more recipients; and decrypting the digital file with the private key.

Another exemplary embodiment of the present invention provides another method of providing access to a digital file. The method comprises encrypting a digital file; obtaining biometric data associated with a user; determining whether the user is authorized to access the digital file based on the biometric data; granting the user access to the digital file if the user is authorized to access the digital file.

These and other aspects of the present invention are described in the Detailed Description of the Invention below and the accompanying figures. Other aspects and features of embodiments of the present invention will become apparent to those of ordinary skill in the art upon reviewing the following description of specific, exemplary embodiments of the present invention in concert with the figures. While features of the present invention may be discussed relative to certain embodiments and figures, all embodiments of the present invention can include one or more of the features discussed herein. Further, while one or more embodiments may be discussed as having certain advantageous features, one or more of such features may also be used with the various embodiments of the invention discussed herein. In similar fashion, while exemplary embodiments may be discussed below as device, system, or method embodiments, it is to be understood that such exemplary embodiments can be implemented in various devices, systems, and methods of the present invention.

BRIEF DESCRIPTION OF THE DRAWINGS

The following Detailed Description of the Invention is better understood when read in conjunction with the appended drawings. For the purposes of illustration, there is shown in the drawings exemplary embodiments, but the subject matter is not limited to the specific elements and instrumentalities disclosed.

DETAILED DESCRIPTION OF THE INVENTION

Figure 1:
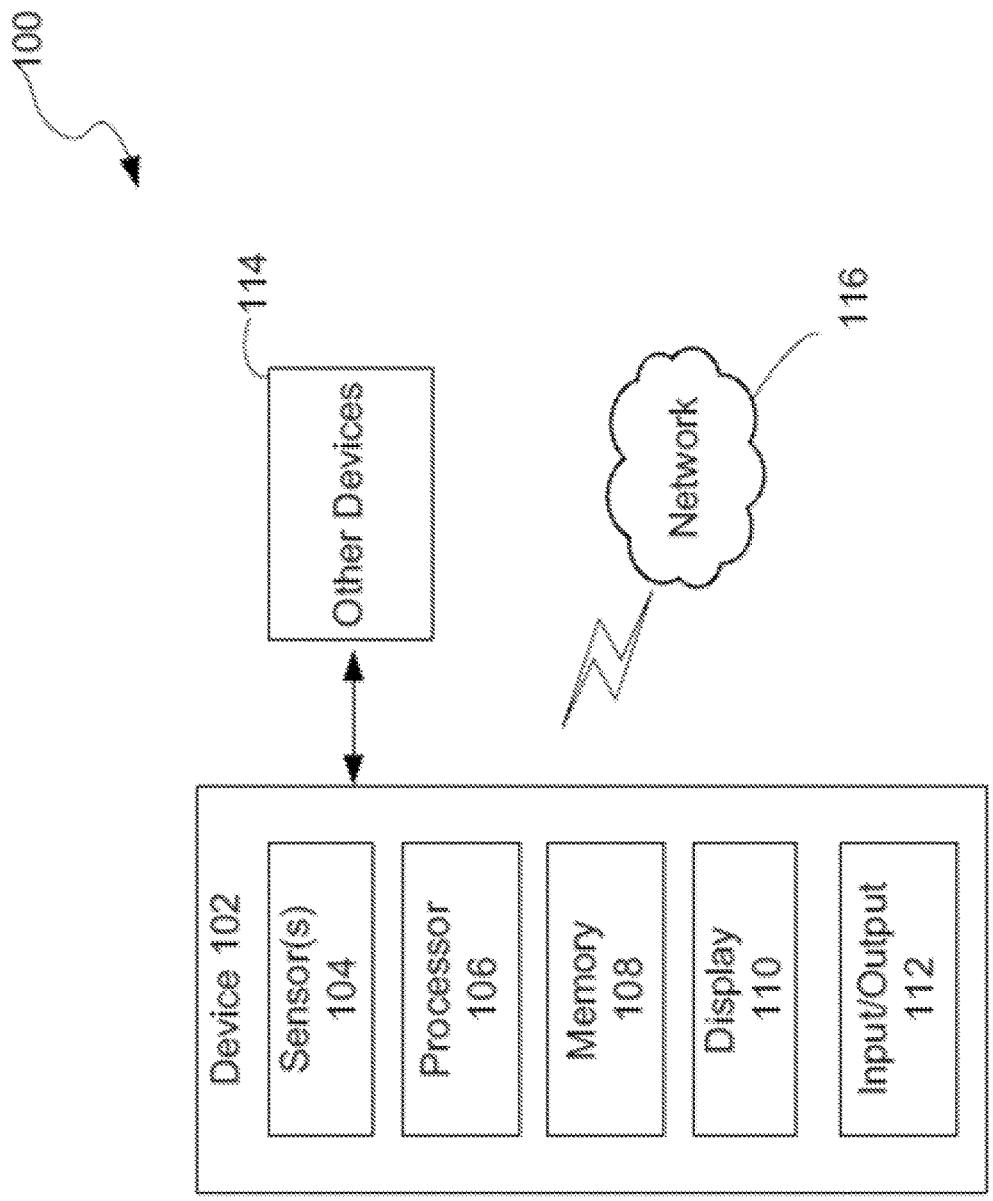
FIG. 1 is an example concurrent real-time identity verification and authentication system, in accordance with some exemplary embodiments of the present invention.

Although exemplary embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the preferred embodiments, specific terminology will be resorted to for the sake of clarity.

It must also be noted that, as used in the specification and the appended claims, the singular forms "a," "an" and "the" include plural referents unless the context clearly dictates otherwise.

Also, in describing the preferred embodiments, terminology will be resorted to for the sake of clarity. It is intended that each term contemplates its broadest meaning as understood by those skilled in the art and includes all technical equivalents that operate in a similar manner to accomplish a similar purpose.

Ranges may be expressed herein as from "about," "substantially," or "approximately" one particular value and/or to "about," "substantially," or "approximately" another particular value. When such a range is expressed, another embodiment includes from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Biometric identification techniques generally refer to pattern recognition techniques that perform a user identification process by determining the authenticity of a specific physiological or behavioral characteristic possessed by the user. Biometric identification is preferred over traditional methods involving passwords and personal identification numbers (PINs) for various reasons. For example, with biometric identification, the person to be identified is typically required to be physically present at the point-of-identification. Additionally, identification based on biometric techniques obviates the need to remember a password or carry a token.

Security systems that rely on biometric parameters are generally more difficult to circumvent than other systems, but they are expensive to implement and are slow for applications requiring identification of a large number of people in a short amount of time.

One kind of texture based local binary pattern ("LBP") feature describes facial information that produces good recognition results. The improved local ternary pattern ("LTP") feature may be a further improvement over traditional methods. LBP and LTP features may not be sensitive to light and expression variations and are computationally efficient, but they also have shortcomings, such as information redundancy due to manmade blocking.

It is therefore desirable to contemplate concurrent real-time identity verification and authentication techniques to create biometric signature data for providing keyless access to authorized users to a vehicle, building, or the like, quickly, accurately, interchangeably, and with varying degrees of security by utilizing various types of biometric data of authorized users. As discussed above, in some embodiments of the present invention, the biometric signature data is interchangeable across a wide variety of applications. Accordingly, in some embodiments of the present invention, the same biometric signature data for a person can be used to authenticate that person at a plurality of locations and for a plurality of applications. Additionally, the present invention allows the biometric signature data to be altered based on a desired security level. Thus, the type of biometric signature data that is used for a particular application and/or a particular individual can vary depending on the security level desired for that particular application and/or individual. While some embodiments discussed herein are discussed in the context of facial biometric data, the invention is not so limited. Instead, as those skilled in the art would understand, various embodiment of the present invention can employ many types of biometric data, including, but not limited to, fingerprint data, iris and retinal scan data, speech data, facial thermograms, hand geometry data, and the like.

Referring to FIG. 1, an example system 100 for concurrent real-time identity verification and authentication for use in, e.g., allowing access by an authorized user to a vehicle, building, or the like is illustrated in accordance with aspects of the present invention.

It should be appreciated that FIG. 1 is intended to describe aspects of the invention to enable those skilled in the art to practice the invention. Other embodiments may be utilized and changes may be made without departing from the scope of the present invention.

The illustrated identification system 100 comprises a concurrent real-time identity verification and authentication device 102 including at least one biometric sensor 104, a processor 106, memory 108, a display 110, and input/output mechanism 112. The identification system 100 may be used to secure or control access to any secured area, device, or information, such as an airport boarding area, building, stadium, database system, locked door, or other systems or devices.

Figure 2:
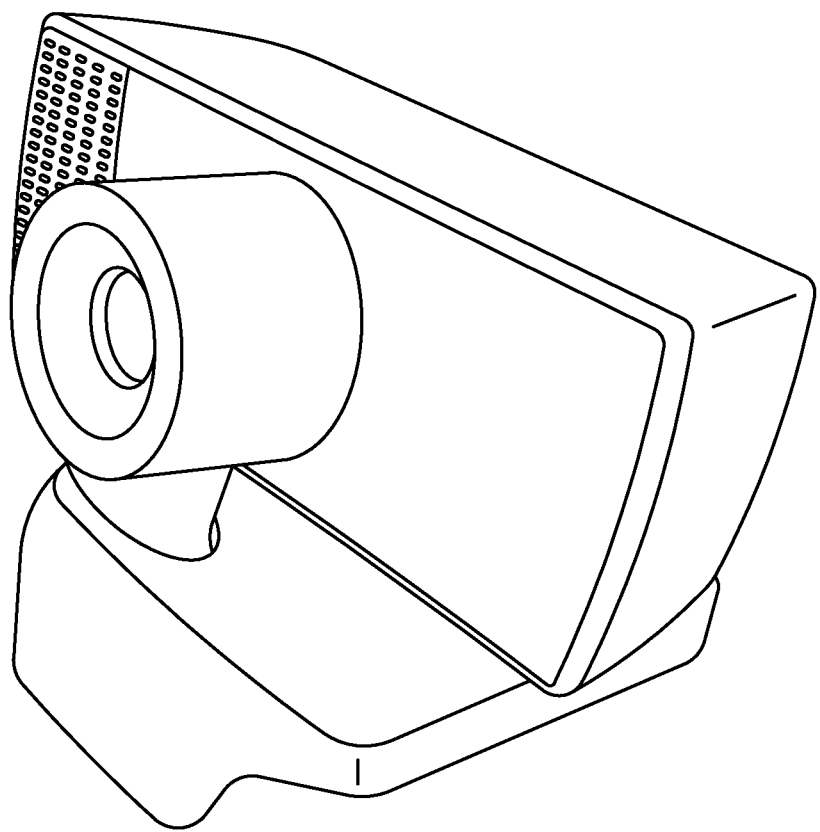
FIGS. 2-4 show various perspective views of an example concurrent real-time identity verification and authentication device, in accordance with some exemplary embodiments of the present invention.
Figure 3:
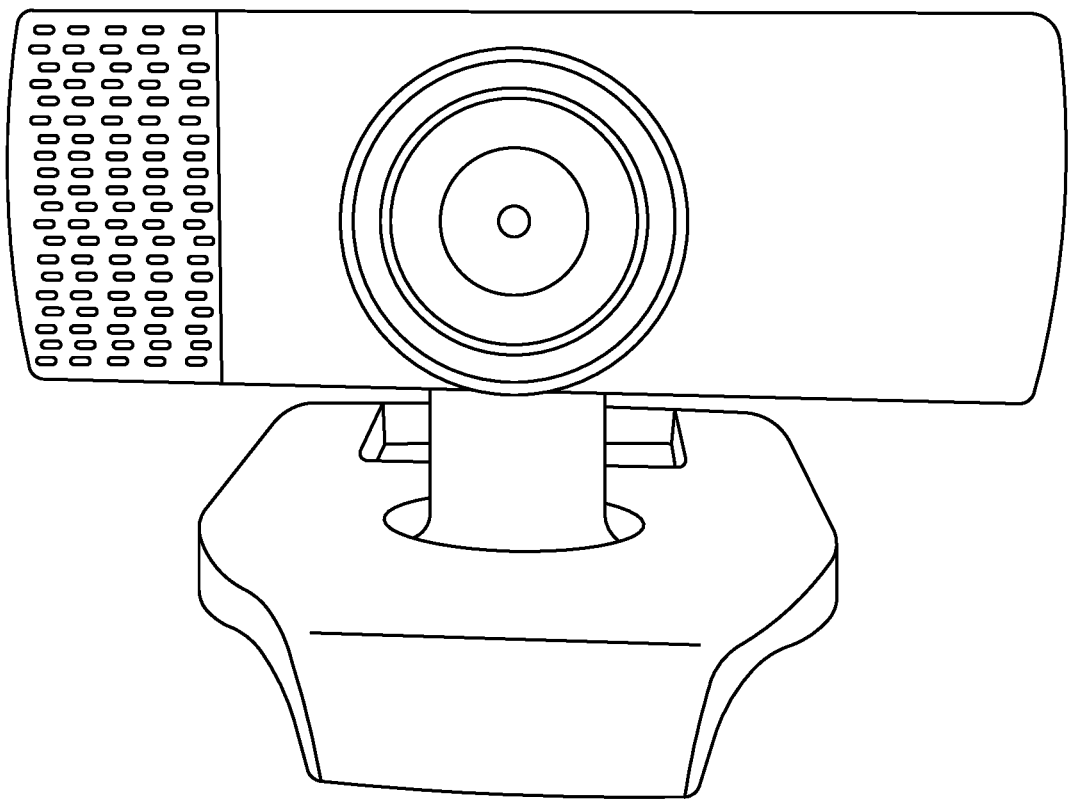
Figure 4:
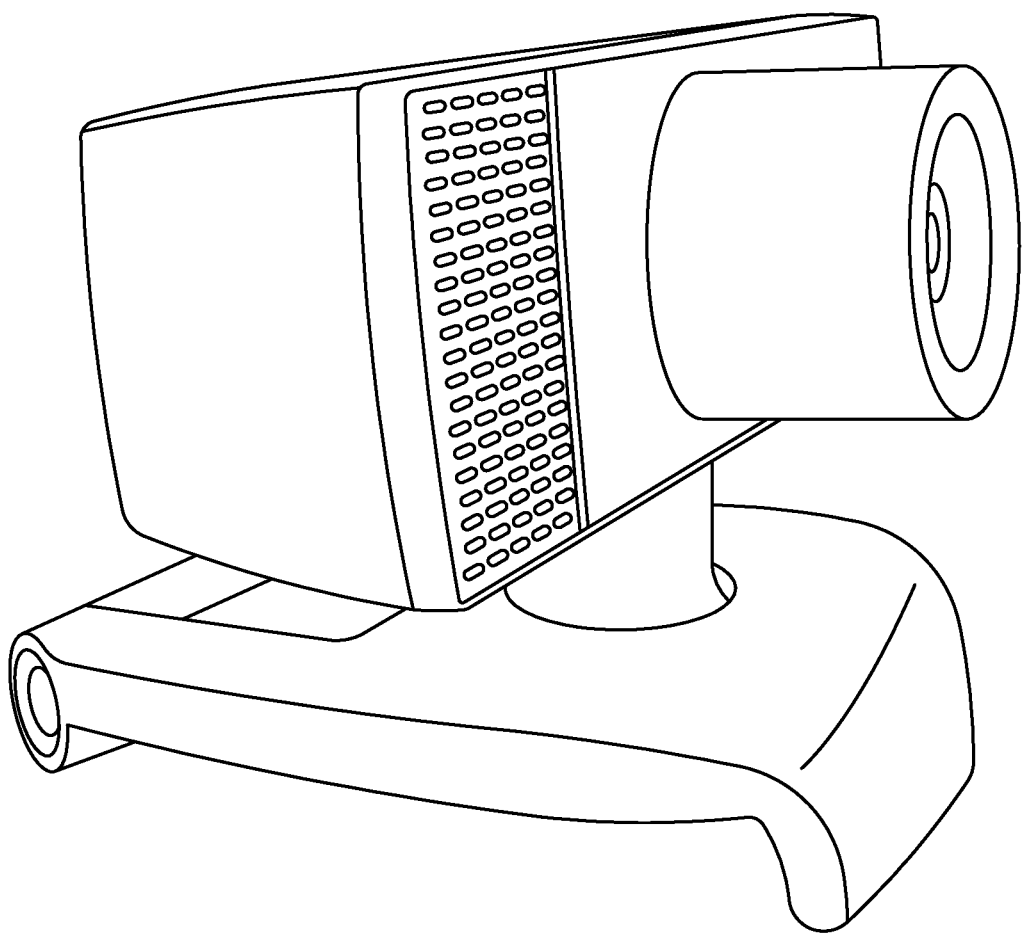

The biometric sensor(s) 104 may include a camera, a fingerprint reader, retinal scanner, facial recognition scanner, weight sensor, height sensor, body temperature sensor, gait sensor, heartbeat sensor, or any other sensor or device capable of sensing a biometric characteristic of a person. It should be appreciated that the device 102 may include multiple biometric sensors for collecting biometric characteristics. As shown in FIGS. 2-4, in an exemplary embodiment of the present invention, the biometric sensor(s) 104 can be a camera.

In some aspects, the biometric sensor(s) 104 may include a receiver or multiple receivers for sensing signals from devices carried by a person to be identified. For example, the signal sensors may sense signals transmitted from a wireless telephone, a portable computer, a navigation device, a garage door opener, a keyless entry transmitter, an electronic tag, or any other device that can be carried by a person to be identified. To sense information from passive devices that do not regularly transmit signals, the signal sensors may include an interrogation transmitter and circuit similar to those used in radio-frequency identification ("RFID") systems.

The processor 106 may be configured for comparing the sensed information via biometric sensor(s) 104 with known characteristics of a person in an attempt to identify the person via biometric signature data. The processor 106 may include any number of processors, controllers, integrated circuits, programmable logic devices, or other computing devices and resident or external memory for storing data and other information accessed and/or generated by the system. The processor 106 may be coupled with the biometric sensor(s) 104 and other components of the system 100 through wired or wireless connections to enable information to be exchanged between the device 102 and external devices 114 or systems (e.g., network 116) to allow for comparison of the stored biometric signature data with the information obtained from the biometric sensor(s) 104.

The processor 106 may implement a computer program and/or code segments stored on memory 108 to perform some the functions described herein. The computer program may comprise an ordered listing of executable instructions for implementing logical functions in the device 102. The computer program can be embodied in any computer-readable medium (e.g., memory 108) for use by or in connection with an instruction execution system, apparatus, or device, and execute the instructions. Memory 108 may contain, store, communicate, propagate or transport the program for use by or in connection with the instruction execution system, apparatus, or device. Examples of memory 108 may include an electrical connection having one or more wires, a random access memory (RAM), a read-only memory (ROM), an erasable, programmable, read-only memory (EPROM or Flash memory), a portable computer diskette, or a portable compact disk read-only memory (CDROM). Memory 108 may be integral with the device 102, stand-alone memory, or a combination of both. Memory 108 may include, for example, removable and non-removable memory elements such as RAM, ROM, Flash, magnetic, optical, USB memory devices, and/or other conventional memory elements.

In some aspects, memory 108 may store the known characteristics of a number of people and various other data associated with operation of the system 100, such as the computer program and code segments mentioned above, or other data for instructing the device 102 and other device elements to perform the aspects described herein. The various data stored within memory 108 may be associated within one or more databases (not shown) to facilitate retrieval of the information, e.g., via external devices 114 or network 116. Although memory 108 as shown in FIG. 1 is integrated into the device 102, it should be appreciated that memory 108 may be stand-alone memory positioned in the same enclosure as the device 102, or may be external memory accessible by the device 102.

In an aspect, the display 110 may be configured to display various information relating to the system 100 and its underlying operations. For example, a notification device may be included (not shown) for indicating the sensed biometric characteristic or the sensed signal fail to match the known characteristics of the person and may include an audible alarm, a visual alarm, and/or any other notification device.

In an aspect, the device 102 may also include input/output mechanism 112 to facilitate exchanging data and other information among different components within the device 102, or with various external devices 114 or systems via network 116.

For example, various I/O ports may be contemplated including a Secure Disk Digital (SD) card slot, Mini SD Card slot, Micro SD Card slot or the like for receiving removable SD cards, Mini SD Cards, Micro SD Cards, or the like, and a USB port for coupling with a USB cable connected to another computing device such as a personal computer. In some aspects, the input/output mechanism 112 may include an input device (not shown) for receiving identification information about a person-to-be-identified. The input device may include a ticket reader, a credit card reader, an identification reader, a keypad, a touch-screen display, or any other device. In some other aspects, as described above, the input/output mechanism 112 may be configured to enable the device 102 to communicate with other electronic devices through the network 116, such as the Internet, a local area network, a wide area network, an ad hoc or peer to peer network, or a direct connection such as a USB, Firewire, or Bluetooth™ Connection, etc. In one example, known characteristics about persons may be stored and retrievable in remote databases or memory via the network 116. The input/output mechanism 112 may thus communicate with the network 116 utilizing wired data transfer methods or wireless data transfer methods such as WiFi (802.11), Wi-Max, Bluetooth™, ANT®, ultra-wideband, infrared, cellular telephony, radio frequency, etc. In an aspect, the input/output mechanism 112 may include a cellular transceiver for transmitting and receiving communications over a communications network operable with GSM (Global System for Mobile communications), CDMA (Code Division Multiple Access), or any other known standards.

The device 102 may also include a power source (not shown) for providing electrical power to the various components contained therein. The power source may include batteries, battery packs, power conduits, connectors, and receptacles operable to receive batteries, battery connectors, or power cables.

In an aspect, the device 102 may be installed and positioned on an access control device (not shown) such as a gate, locked door, etc. for preventing persons from accessing certain areas until the device 102 determines that the sensed biometric characteristic and/or signal match the known characteristics. In some other aspects, as shown in FIGS. 2-4, the device 102 may be a stand-alone, compact, handheld, and portable device. In one example, one may use such a stand-alone, compact, handheld, and portable device to protect sensitive documents or information that are electronically stored and accessed on the Internet. In some aspects, a concurrent realtime identity verification facility access unit may use biometric signature data to create interchangeable authentication for a variety of uses (e.g., office, home, smart phone, computer, facilities).

Figure 5:
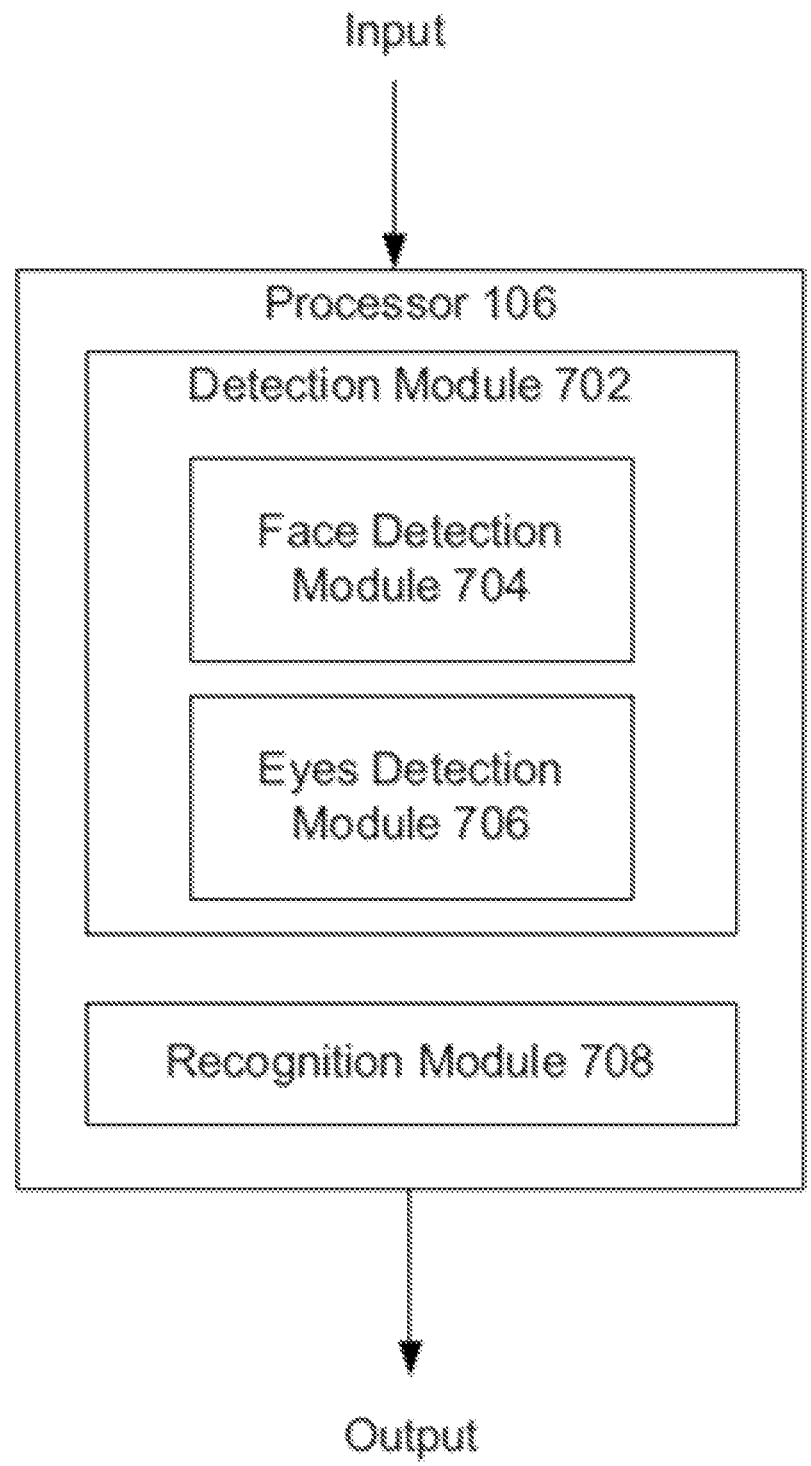
FIG. 5 is a block diagram of an example processing component of a concurrent real-time identity verification and authentication device, in accordance with some exemplary embodiments of the present invention.

Referring to FIG. 5, the processor 106 in FIG. 1 may be configured to include, among other features, a detection module 702 and a recognition module 708 for providing concurrent real-time identity verification and authentication with keyless access to authorized users to secured facilities or information quickly and accurately.

Figure 6:
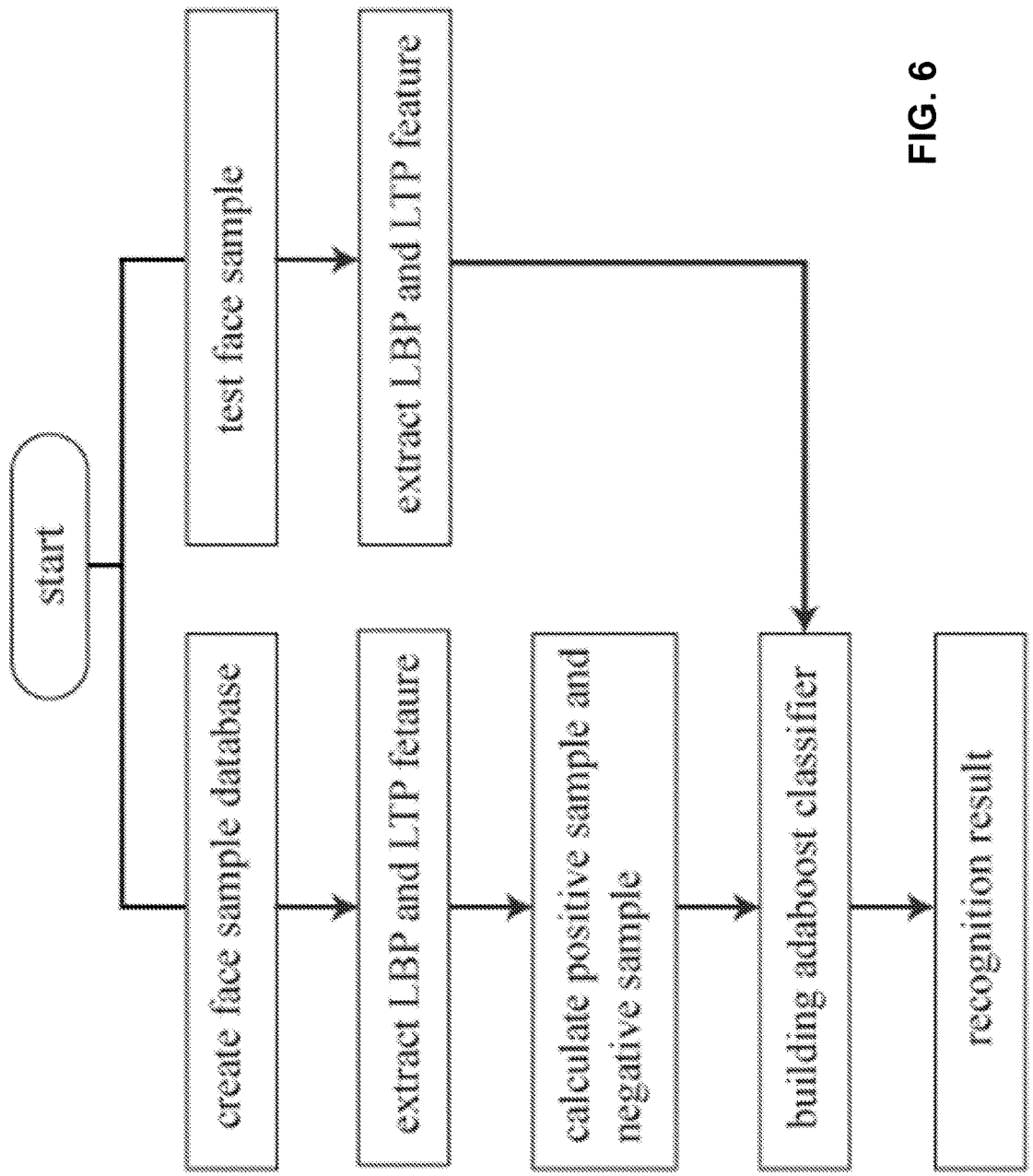
FIG. 6 shows a flow diagram of a human face recognition method, in accordance with some exemplary embodiments of the present invention.

In some aspects, the processor 106 may receive inputs from the sensor(s) 104 in FIG. 6 illustrates biometric parameters of authorized users, such as an acquired image of the person-to-be-identified. In some aspects, FIG. 6 describes an example procedure of selecting key features from a database with a large number of human face information and building one classifier which can distinguish different human faces accordingly. LBP and LTP may be used to provide a full description of face information, and then with the use of an adaptive boosting ("adaboost") learning algorithm, one may select key features and build a classifier to distinguish different human faces by creating biometric signature data. This biometric signature data may be used to create universal verification and authentication that can be used for a variety of applications (e.g., computer, building access, smartphone, automobile, data encryption) with varying degrees of access and security (e.g., access to network, but heightened security for individual computer). The procedure is as below:

By way of one example, one may establish the key features of different positions on human face and build a classifier that can distinguish different human faces. It may include, among other features, the following steps:

(1) Create face samples of, e.g., 1000, different persons with each person showing, e.g., 10, different postures and expressions.

(2) Extract LBP and LTP features from different blocks in different positions of each face sample.

(3) Calculate the feature absolute value distance for the same position of any two different images from one person and set this distance as positive sample feature database. Calculate the feature absolute value distance for the same position of any two different images from different person and set this distance as negative sample feature database.

(4) Select the most distinguishable key feature from the candidate feature database with adaboost and create a human face classifier.

Further, online recognition may include the following steps:

(1) Calculate the offline stage extracted key feature of different blocks in different positions for face sample to be identified.

(2) Calculate the key feature selected from step (1) with that of each human face sample in database and determine whether they belong to the same person or not. If calculated distance is less than the set threshold, it may be determined that they are the same person, otherwise it may be determined that they are not.

Figure 7A:
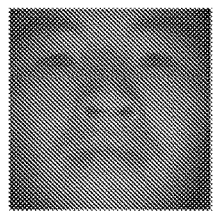
FIG. 7(a) and FIG. 7(b) show different standard human face images for a same person, in accordance with some exemplary embodiments of the present invention.
Figure 7B:
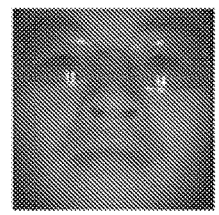
Figure 8:
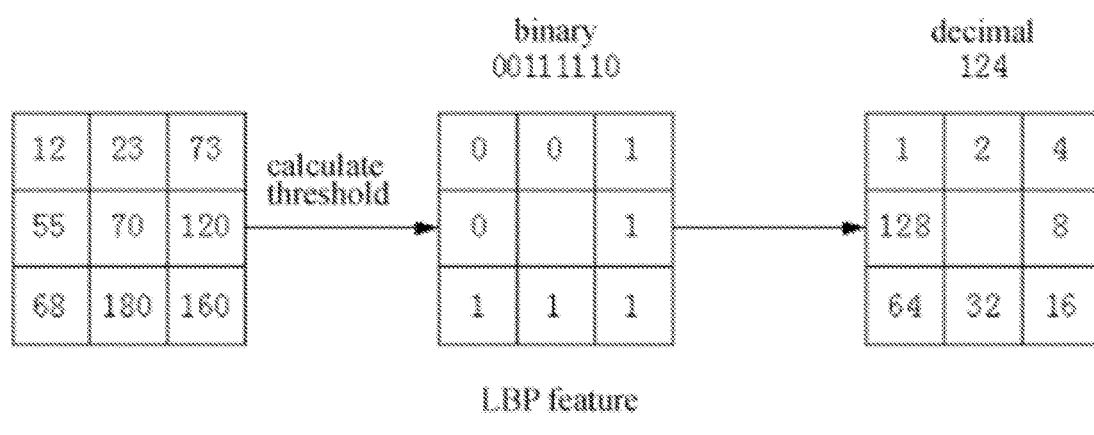
FIG. 8 shows an example calculating process of local binary pattern (LBP) feature, in accordance with some exemplary embodiments of the present invention.

As shown in FIG. 8, an example process starts with creating a face database with different postures and different expressions. For example, one may include the images of, e.g., 1000, different persons and each person shows, e.g., 10, images differently. FIG. 7(*a*) shows the different face image of one same person, and FIG. 7(*b*) refers to the different face image of different person.

Figure 9:
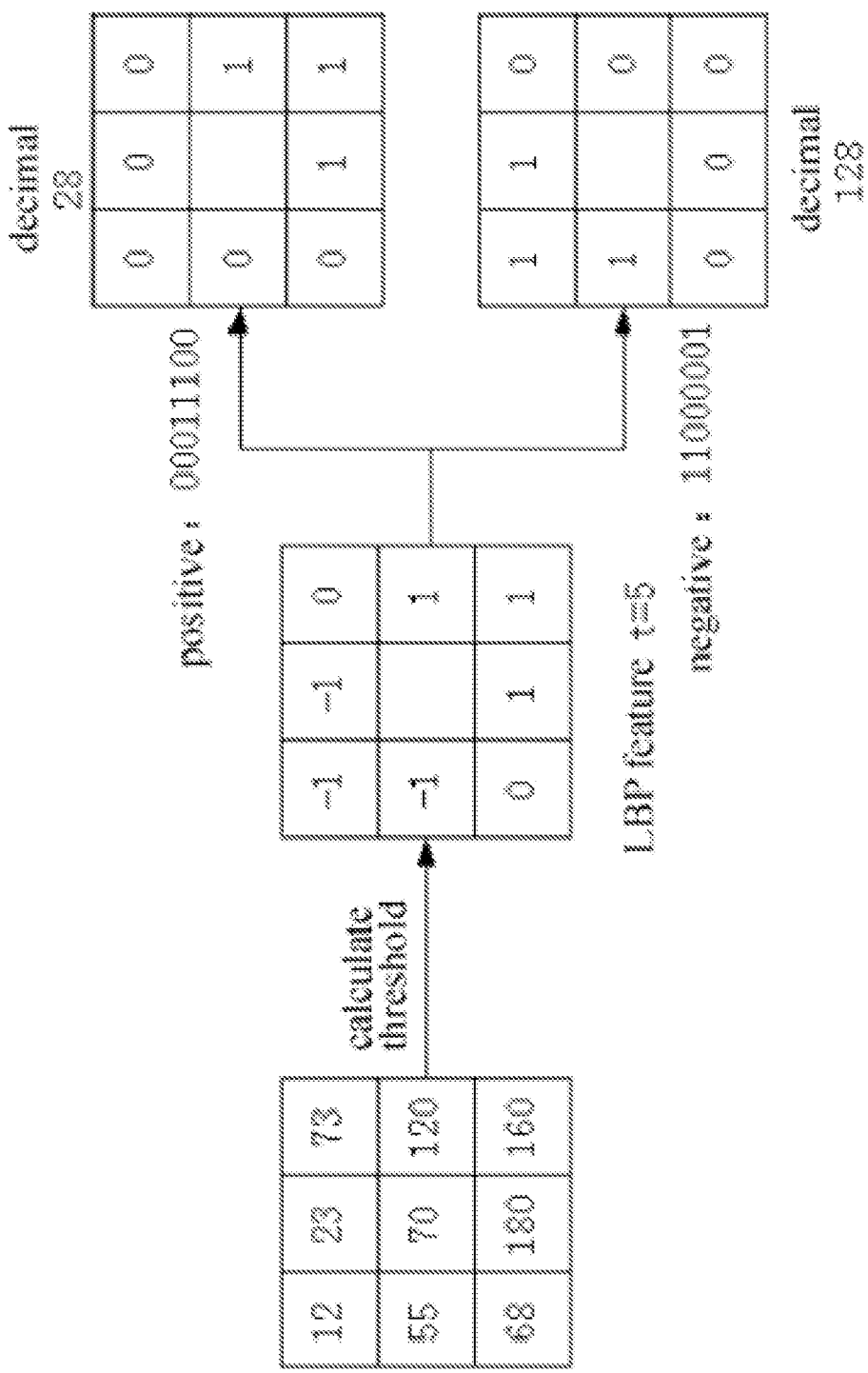
FIG. 9 shows an example calculating process of local ternary pattern (LTP) feature, in accordance with some exemplary embodiments of the present invention.

Thereafter, calculate the feature database describing large number of human face information. LBP and LTP may be used to describe human face. FIG. 8 shows a calculating process of LBP features, and FIG. 9 shows a calculating process of LTP features. In order to obtain as many features to describe human face information, different block size can be divided on different positions of face sample. For example, face size can be 100×100, block size can be w×h, w and h values can range from 2 to 100, and 7837 blocks may be selected as a result. Select the bin features of LBP and LTP on different block size and make it as the final candidate feature database.

The next step is to calculate positive samples and negative samples. The bin feature absolute value distance of the same position for different images from a same person can be calculated and set as the positive sample. Additionally, the bin feature absolute value distance of same position for different persons can be calculated and set as the negative sample. For example, the result may involve calculating 32356 positive samples and 58747698 negative samples.

Thereafter, the key bin feature that can distinguish all positive and negative samples among the large number of feature database can be selected with a learning algorithm. For example, one may choose the learning algorithm of discrete adaboost to select feature and build a classifier.

An example method of using adaboost to classify may include the following steps:

1. Given f as the maximum negative sample error rate, d as the minimum positive sample correct rate, $F_{tar}$ as the target of negative sample error rate, and $D_{tar}$ as the target of positive sample correct rate that cascade classifier has to achieve. P, N are the positive and negative database, respectively.

2. Set $F_0=1.0$, $D_0=1.0$, and $i=0$;

3. When $F_i > F_{tar}$, $i=i+1$, $n_i=0$, $F_i=F_{i-1}$; when $F_i > f \times F_{i-1}$, $n_i = n_{i+1}$.

4. Compute the strong classifier with n features via adaboost in database P and N; calculate $F_i$ and $D_i$ for current cascade classifier, adjust the threshold value of current strong classifier until the rate is no less than $d \times D_{i-1}$, N is nonempty set.

5. If $F_i > F_{tar}$, classify the currently obtained cascade classifier in other negative sample image and determine, put wrongly determined image into N.

1) Given n computing sample $(x_1, y_1), \ldots, (x_n, y_n)$, $y_i = 0, 1$, $x_i$ presents negative sample label and positive sample label, respectively.

2) Initialize weight $$\omega_{l,i} = \frac{1}{2m}, \frac{1}{2l},$$

where the number of positive samples is l and the number of negative samples is m.

3) Try t from 1 to T and run below steps repeatedly:

a) Normalize weight $\omega_{t,i} = \omega_{t,i}/\Sigma_{j=1}^{n} \omega_{t,j}$ b) Compute a weak classifier $h_j$ for each feature $f_j$ and mark the error rate of this classifier $\varepsilon_j = \Sigma_i \omega_{t,j} |h_j(x_i - y_i)|$ c) Find out classifier $h_t$ with lowest error rate $\omega_t$ among all weak classifier computed from last step, d) Update weight $\omega_{t+1,i} = \omega_{t,i} \beta_t^{1-e}$ among which $\beta_t = \varepsilon_t/(1-\varepsilon_t)$. If $x_i$ is correctly classified, $e_i = 0$. Otherwise $e_i = 1$.

Figure 10:
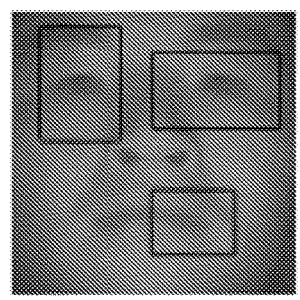
FIG. 10 shows positions of three example key features selected among face images, in accordance with some exemplary embodiments of the present invention.

Get the strong classifier lastly: if $\Sigma_{t=1}^{T} \alpha_t h_t(x) \geq \frac{1}{2} \Sigma_{t=1}^{T} \alpha_t$ then $h(x) = 1$, otherwise $h(x) = 0$. There, $\alpha_t = \log 1/\beta_t$ FIG. 10 shows the position of the first three key features selected among face image by taking online testing for human face database of 100 persons based on offline selected features and classifier.

Figure 11:
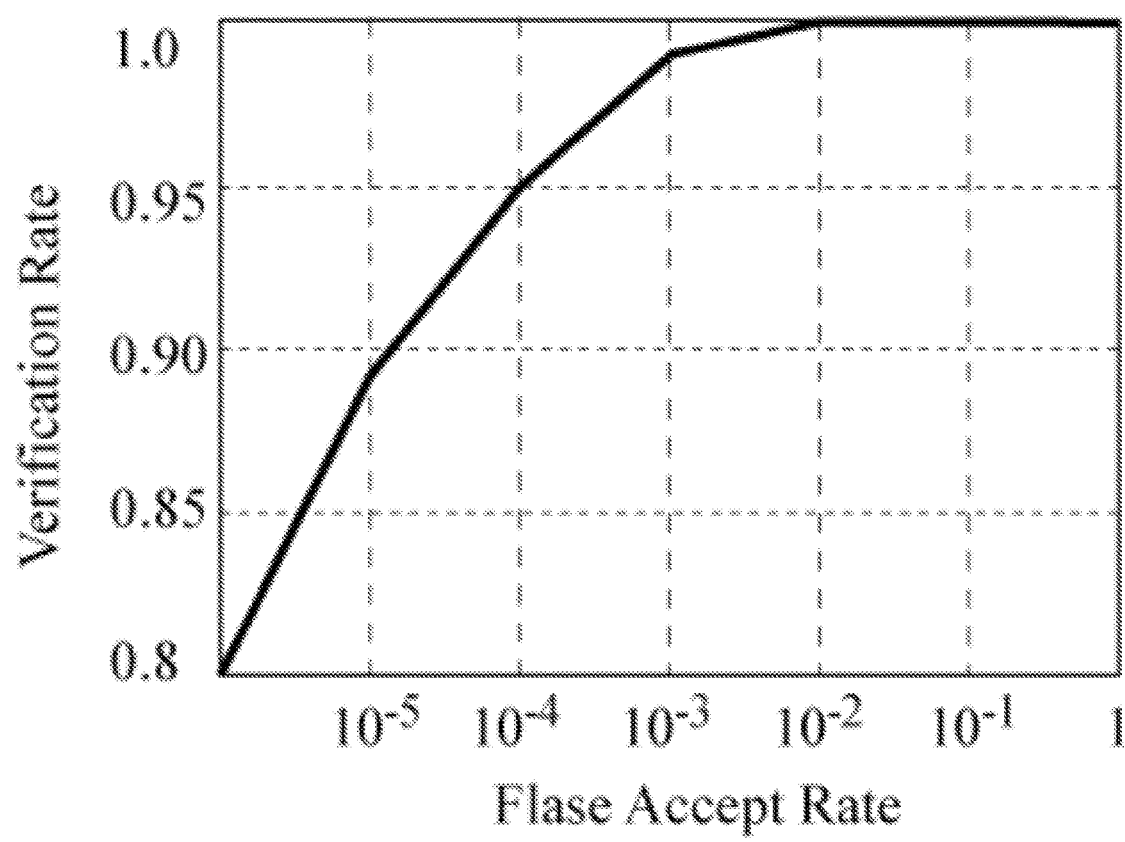
FIG. 11 shows an example ROC curves for testing face database, in accordance with some exemplary embodiments of the present invention.

FIG. 11 shows recognition results for 100 persons, wherein X axis represents false accept rate, which means the wrongly identified rate of face samples. Y axis represents verification rate, which means the rate of face samples correctly recognized. As shown in FIG. 11, when the false accept rate is below $10^{-4}$, it may achieve 95% recognition rate. The face recognition in this example not only improves the robustness of face sample, but also reduces its computational complexity thus improves the face recognition significantly.

Referring back to FIG. 5, in some aspects, the detection module 702 may be configured to use, among other features, a face detection module 704 and an eyes detection module 706 for processing the acquired image of the person-to-be-identified as follows.

Face Detection Module 704

Inputs: Acquired frontal face image (grey image), human face classifier

Outputs: Human face frame positions, and the number of human faces

Flow:

a. Reduce the acquire frontal face image to user-defined size b. Calculate an integral image of the reduced image c. Initialize a traverse window based on the size defined by the human face classifier, e.g., 20×20 d. Move the traverse window on the integral image from left to right and then from top to bottom with each move distance corresponding to a user-defined distance. However, if the user-defined distance is zero, set the move distance as 1/20 of the width of the traverse window.

e. Use the human face classifier to determine whether the current position of the traverse window defines a valid portion of a human face. If so, save the current rectangular frame position of the traverse window as results.

f. After traversing the entire integral image, increase the width and the length of the traverse window by 1.1 times and repeat step e until the size of the traverse window exceeds the size of the image, or the buffer allocated for saving the results is used up.

g. Return to human face frame position and human faces

Eyes Detection Module 706

Inputs: Acquired frontal face image (grey image), human face frame positions, classifier for both left and right eyes, left eye classifier, right eye classifier, left eye coarse detection classifier, right eye coarse detection classifier Outputs: frame position for both eyes, frame position of left eye, and frame position of right eye Flow:

a. Obtain human face image from the acquired frontal face image b. If user-defined classifier for both left and right eyes is available, use correspondingly defined human face detection function to detect both the left and right eyes of the obtained human face image. If not, estimate the positions of both the left and right eyes based on experience.

c. If user-defined left/right eye course detection classifier for the left/right eye is available, detect the left/right eye on the corresponding half of the obtained human face image. Further, based on the coarse detection result, determine whether the detected human subject is wearing glasses or not. If glasses are present, detect the obtained human face image and return with results. If no glasses are present, continue to detect the obtained human face image based on the coarse detection result and return the detection result without considering the presence of glasses. (If user-defined classifier for glasses-wearing subject is not available, detect the obtained human face image without considering the presence of glasses.)

d. If user-defined course detection classifiers are not available, determine whether glasses are present by directly detecting the left/right half of the obtained human face image. If glasses are present, detect the obtained human face image and return with results. If no glasses are present, continue to detect the obtained human face image based on the coarse detection result and return the detection result without considering the presence of glasses. (If user-defined classifier for glasses-wearing subject is not available, detect the obtained human face image without considering the presence of glasses.)

e. Return

In some aspects, the processor 106 may further use, e.g., a recognition module 708, to extract pertinent facial features obtained from the detection module 702 for comparing against known characteristics and/or information of a number of authorized people as follows.

Recognition Module 708

Normalization

Inputs: to-be-normalized image (grey image), the coordinates of the centers of both the left and right eyes on the image axis (the origin is located at the left top corner of the image). The meanings of parameters: 1x refers to the x coordinate of the center point of the left eye (horizontal direction) in the output image divided by the width of the output image, and 1y refers to x coordinate of the center point of the left eye (vertical direction) in the output image divided by the height of the output image.

Output: output image

Feature Extraction

Inputs: Normalized image (grey image) and feature types

Outputs: If output buffer is NULL, return feature dimensional degrees. Otherwise, assume the size of the output buffer equals the feature dimensional degrees, write the features of the image into the buffer, and return feature dimensional degrees. Certain features are associated with certain image size. For example, #6 feature may require the image size of 100 by 100. Therefore, when the input image fails corresponding defined image size requirement, a result of zero can be returned.

Feature Comparison

Inputs: Two features to be compared and the comparison method

Output: The smaller the comparison result (a floating point), the higher the similarity.

Obtaining Algorithm Information

Function: instruct the user to correctly assign parameters for the algorithm

Input: algorithm type based on the usage context

Outputs: parameters information of the algorithm including feature type, feature dimensional degrees, normalized image size, the minimum distance, suggested range, and distance type.

Many of the systems and methods described above can be used to create Biometric Signature Data ("BSD") files that allow a system to identify and distinguish individuals with a high degree of accuracy. Various embodiments of the present invention can employ the BSD files to create an encryption/decryption key, thus increasing the security of such keys. Embodiments of the present invention can generate asymmetric keys based on one or more BSD files in such a way that by utilizing a biometric sensor, a person's biometric measurement can act as the person's private key. Embodiments of the present invention can also incorporate BSD files into DRM security in such a way that files cannot be decrypted or accessed by anyone other than the individual or group of individuals intended, or encrypted in a way that the original owners, such as a business, can no longer access the files. Accordingly, by using embodiments of the present invention employing BSD files, when a file is accessed, there can be assurance of the identity of the individual who accessed the file.

BSD files can be generated by the algorithmic analysis of data from an A/D IR sensor. Accordingly, many of these elements can be considered when constructing the private key of the asymmetrical pair (i.e., analog and/or digital values). Thus, in some embodiments of the present invention, multiple elements of a sensor can contribute real-time data or real-time analog data related to a recognition event in order to de-encrypt, thus ensuring a real-time event (i.e., the actual measurement of the intended person) has triggered the authentication.

Figure 12:
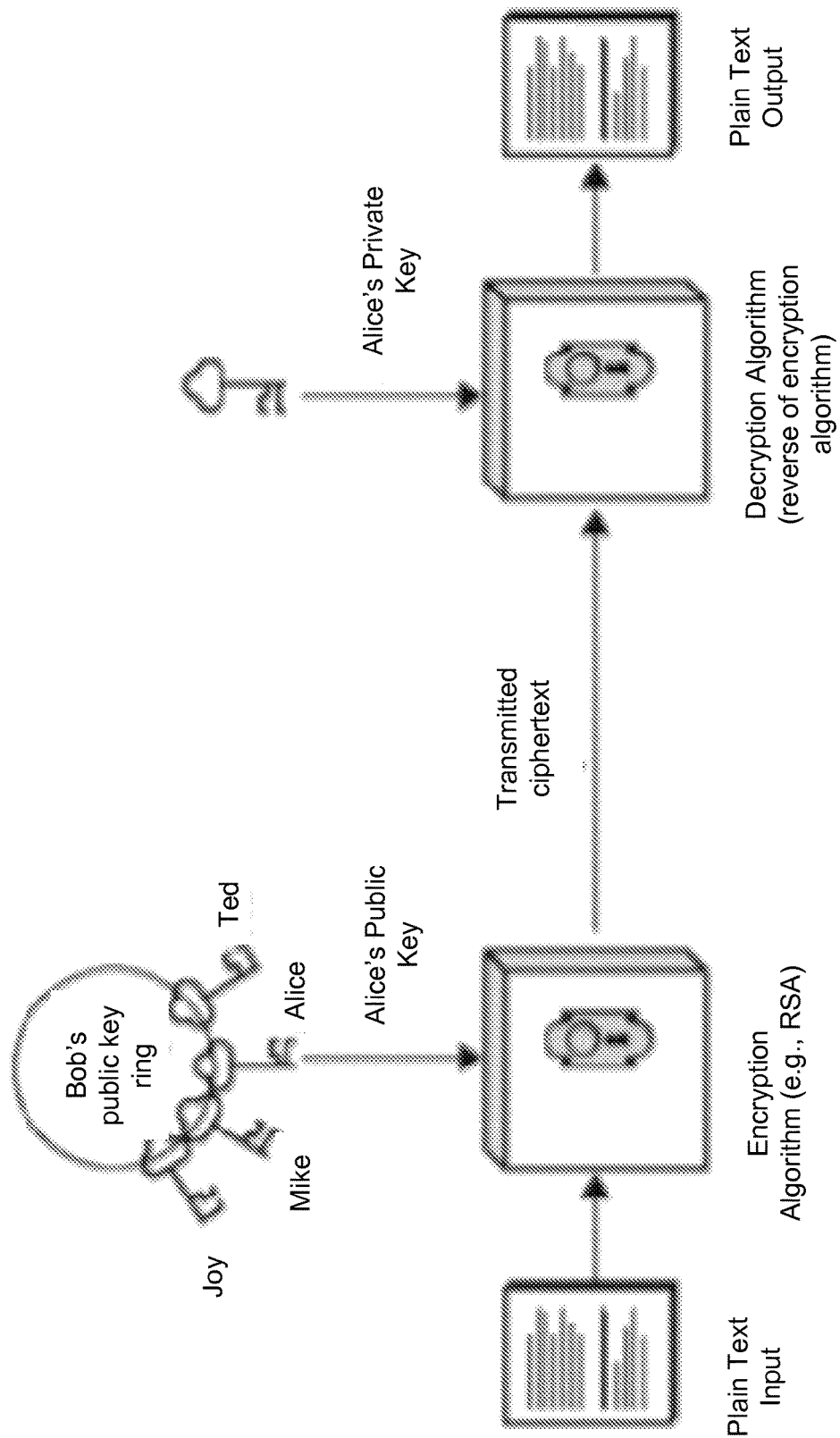
FIG. 12 illustrates biometric, asymmetric encryption for confidentiality, in accordance with some exemplary embodiments of the present invention.
Figure 13:
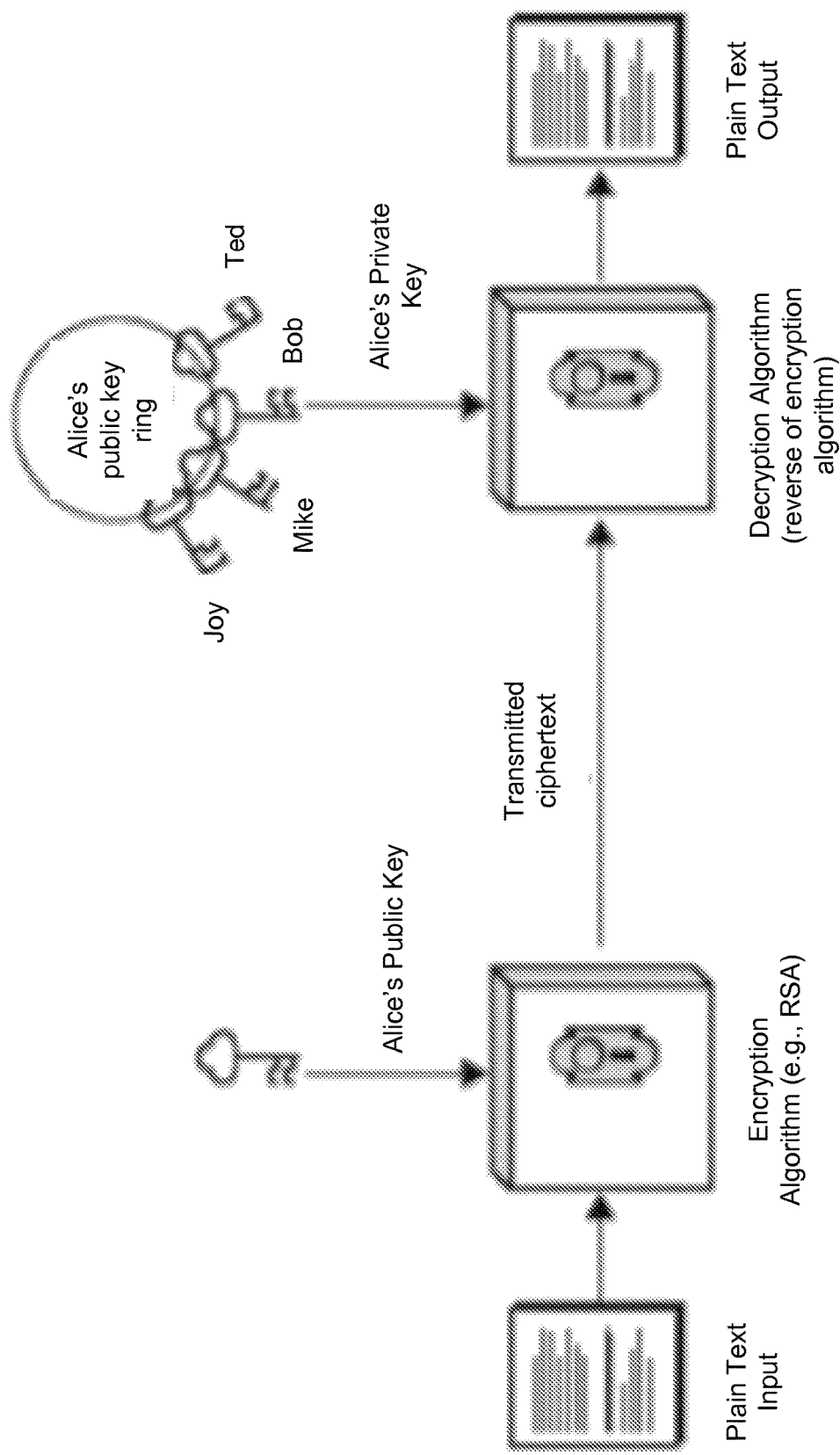
FIG. 13 illustrates biometric, asymmetric encryption for authentication, in accordance with some exemplary embodiments of the present invention.

As shown in FIGS. 12-13, in accordance with some embodiments of the present invention, messages can be sent as follows. A user can register herself, e.g., on a computer, and create her public key. The user than then publish the public key so that the key is publicly known. Other people, systems, or entities, can use the user's public key to encrypt messages for the user and send those messages to the user. The user can decrypt the message using her private key created by one or more live BSD files associated with the user. Accordingly, the sender of the message is ensured that the user is actually the person decrypting the message because the private key used to decrypt the message can be generated by the user's live biometric data. These systems and methods for encryption provide substantial advantages over conventional systems and methods. For example, instead, of simply matching anonymous asymmetrical codes, by using BSD filed in the encryption process, authentication because inherent in the key itself.

Various embodiments of the present invention can also improve DRM. For example, DRM rules can allow for additional content to be added to a file and additional rules to be required. DRM rules can be expressed in many rights management languages known in the art, including but not limited to, XrML (extensible rights markup language), XMCL (extensible media commerce language), ODRL (open digital rights language), and the like. Rules can specify the actions that are permitted (e.g., decrypting, encrypting, transferring, copying, editing, etc.). The rules can also specify the people authorized to perform actions and the conditions under which these actions are permitted. BSD files can be used to authenticate a user to determine whether the user is one of the people specified in the rules.

Various systems and methods for biometric encryption and authentication can also find application in corporate settings where, e.g., employees use corporate devices for personal use as well as business, or the inverse, or when, e.g., an employee uses a personal device and the corporate digital assets are transferred to and from the personal device. By applying rules to documents that have certain digital signatures, both parties can be assured that there can be controllable segmentation between private and business concerns. Both parties can have access to the parts they are entitled to access but can be prevented from accessing parts that are not entitled to access. For example, possible applications include, but are not limited to, providing remote access, making purchases, and conditional security.

In the case of remote access, various embodiments of the present invention can generate BSD files used to authenticate a user, thus providing secure access for any remote network connection, i.e., VPN server, secure access to network email, and/or company proprietary information, from a remote device.

Additionally, biometric authentication techniques of the present invention can be used to make authenticated online purchases/transactions. For example, spending limits can be based on individual or group profile for an account. In order for a user to make a purchase, a system can use the biometric authentication techniques of the present invention to authenticate the true identity of that user to verify the user is entitled to make the desired purchase.

Biometric authentication techniques can also be used to provide conditional security to various digital files. For example, files that contain sensitive information can only be accessed by authorized users, which can be authenticated using the user's live BSD files.

Biometric Encryption and Authentication Application to Digital Cinema

The biometric encryption and authentication techniques described herein find many applications in the digital cinema industry. Movies are hot commodities, especially pre-DVD release. In order to maximize both production efficiencies and distribution opportunities, movies need to be accessed and handled by many different strata of individuals. Persons skilled in the art appreciate that techniques capable of protecting digital assets in the digital cinema industry can be used to protect digital assets in almost any industry. Accordingly, the principles described herein are not limited to application in the digital cinema industry, but may instead be applied to any industry for a similar purpose.

Digital cinema security views itself as an end-to-end process from production via distribution to consumption. SMPTE DC28, the body responsible for digital cinema standards, has identified five separate areas of digital cinema: (1) capture; (2) production; (3) Master (cinema, home, video, trailers, test screenings); (4) distribution (satellite, fiber, packaged); and (5) exhibition (digital projector security). In each area identified by DC28, a movie is vulnerable to theft. In order to discourage theft, movies can be encrypted prior to distribution. Movies are then typically stored in their encrypted state in the theater until showtime. At showtime, the movie is decrypted and decompressed. This decryption/decompression may take place in a server or in a projector.

In an exemplary SMPTE DC28 process, DC28.4 can represent the conditional access portions of the cinema delivery system. Modem DRM encryption methods have proven sufficient to withstand unwarranted deciphering attempts, but securing the keys has become a problem. From capture to exhibition to distribution, a movie is encrypted and decrypted multiple times. Accordingly, various biometric encryption and authentication techniques discussed herein can be applied to one of more of the encryption, decryption, and authentication steps, in accordance with various embodiments of the present invention.

In some exemplary embodiments of the present invention, the steps and functions discussed herein can be performed via a processor and memory. For example, instructions for performing the various functions and steps described herein can be stored in a memory and executed by a processor. Accordingly, in some embodiments of the present invention, an encryption and/or authentication system comprises a processor and memory that together perform an encryption/decryption method. The processor and memory can take many forms in accordance with various embodiments of the present invention. For example, the memory may store logical instructions that can be executed by the processor to perform the various actions described herein. The processor can include any number of processors, controllers, integrated circuits, programmable logic devices, or other computing devices and resident or external memory for storing data and other information accessed and/or generated by the system. The processor may implement a computer program and/or code segments stored on memory to perform some the functions described herein. The computer program may comprise an ordered listing of executable instructions for implementing logical functions. The computer program can be embodied in many computer-readable mediums (e.g., memory) for use by or in connection with an instruction execution system, apparatus, or device, and execute the instructions. Memory may contain, store, communicate, propagate or transport the program for use by or in connection with the instruction execution system, apparatus, or device. Examples of memory may include an electrical connection having one or more wires, a random access memory (RAM), a read-only memory (ROM), an erasable, programmable, read-only memory (EPROM or Flash memory), a portable computer diskette, or a portable compact disk read-only memory (CDROM). Memory may be integral with the stylus and/or touchscreen device, stand-alone memory, or a combination of both. Memory may include, for example, removable and non-removable memory elements such as RAM, ROM, Flash, magnetic, optical, USB memory devices, and/or other conventional memory elements.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions. Further, other modifications or embodiments as may be suggested by the teachings herein are particularly reserved as they fall within the breadth and scope of the claims appended hereto.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. Instead, it is intended that the invention is defined by the claims appended hereto.

The invention claimed is:

1. A method of identity verification using biometric signature data, comprising:
creating a face sample database based on a plurality of acquired face samples;
calculating a feature database by extracting selected features of entries in the face sample database;
calculating positive samples by calculating a feature absolute value distance for a same position of any two different images from one person;
calculating negative samples by calculating a feature absolute value distance for a same position of different people;
calculating a key bin feature using a learning algorithm, the key bin feature distinguishing each of the positive samples and negative samples;
calculating a classifier from the key bin feature for use in identifying and authenticating an acquired face image of a person-to-be-identified; and
identifying and authenticating the person-to-be-identified using the classifier and the acquired face image of the person-to-be-identified.

2. The method of claim 1, wherein calculating a feature database comprises calculating at least one of local binary pattern features and local ternary pattern features from entries in the face sample database.

3. The method of claim 1, wherein the classifier is one of a left eye classifier, right eye classifier, left eye coarse detection classifier, right eye coarse detection classifier or a left eye and right eye classifier.

4. The method of claim 1, wherein the learning algorithm is an adaptive boosting learning algorithm.

5. The method of claim 1, wherein the identifying and authenticating further comprises:
receiving a face image of the person;
extracting at least one feature from the face image; and
using the classifier and the extracted at least one feature to determine the identity of the person-to-be-identified.

6. The method of claim 1, wherein the plurality of acquired face samples are acquired using an analog-to-digital infrared sensor.

7. A system for identity verification using biometric signature data, the system comprising:
a processor; and
a memory storing logical instructions that, when executed by the processor, are configured to:
create a face sample database based on a plurality of acquired face samples;
calculate a feature database by extracting selected features of entries in the face sample database;
calculate positive samples by calculating a feature absolute value distance for a same position of any two different images from one person;
calculate negative samples by calculating a feature absolute value distance for a same position of different people;

calculate a key bin feature using a learning algorithm, the key bin feature distinguishing each of the positive samples and negative samples;

calculate a classifier from the key bin feature for use in identifying and authenticating an acquired face image of a person-to-be-identified; and identify and authenticate the person-to-be-identified using the classifier and the acquired face image of the person-to-be-identified.

8. The system of claim 7, wherein the feature database is calculated by calculating at least one of local binary pattern features and local ternary pattern features from entries in the face sample database.

9. The system of claim 7, wherein the classifier is one of a left eye classifier, right eye classifier, left eye coarse detection classifier, right eye coarse detection classifier or a left eye and right eye classifier.

10. The system of claim 7, wherein the learning algorithm is an adaptive boosting learning algorithm.

11. The system of claim 7, wherein the identify and authenticate a person further comprises:

receive a face image of the person;

extract least one feature from the face image; and use the classifier and the extracted at least one feature to determine the identity of the person-to-be-identified.

12. The system of claim 7, wherein the plurality of acquired face samples are acquired using an analog-to-digital infrared sensor.

13. A non-transitory computer-readable medium having instructions stored therein which, when executed by a processor, are configured to:

create a face sample database based on a plurality of acquired face samples;

calculate a feature database by extracting selected features of entries in the face sample database;

calculate positive samples by calculating a feature absolute value distance for a same position of any two different images from one person;

calculate negative samples by calculating a feature absolute value distance for a same position of different people;

calculate a key bin feature using a learning algorithm, the key bin feature distinguishing each of the positive samples and negative samples;

calculate a classifier from the key bin feature for use in identifying and authenticating an acquired face image of a person-to-be-identified; and identify and authenticate the person-to-be-identified using the classifier and the acquired face image of the person-to-be-identified.

14. The non-transitory computer-readable medium of claim 13, wherein the feature database is calculated by calculating at least one of local binary pattern features and local ternary pattern features from entries in the face sample database.

15. The non-transitory computer-readable medium of claim 13, wherein the classifier is one of a left eye classifier, right eye classifier, left eye coarse detection classifier, right eye coarse detection classifier or a left eye and right eye classifier.

16. The non-transitory computer-readable medium of claim 13, wherein the learning algorithm is an adaptive boosting learning algorithm.

17. The non-transitory computer-readable medium of claim 13, wherein the identify and authenticate a person, further comprises:

receive a face image of the person;

extract least one feature from the face image; and use the classifier and the extracted at least one feature to determine the identity of the person-to-be-identified.

18. The non-transitory computer-readable medium of claim 13, wherein the plurality of acquired face samples are acquired using an analog-to-digital infrared sensor.

* * * * *